United States Patent Office 3,090,984
Patented May 28, 1963

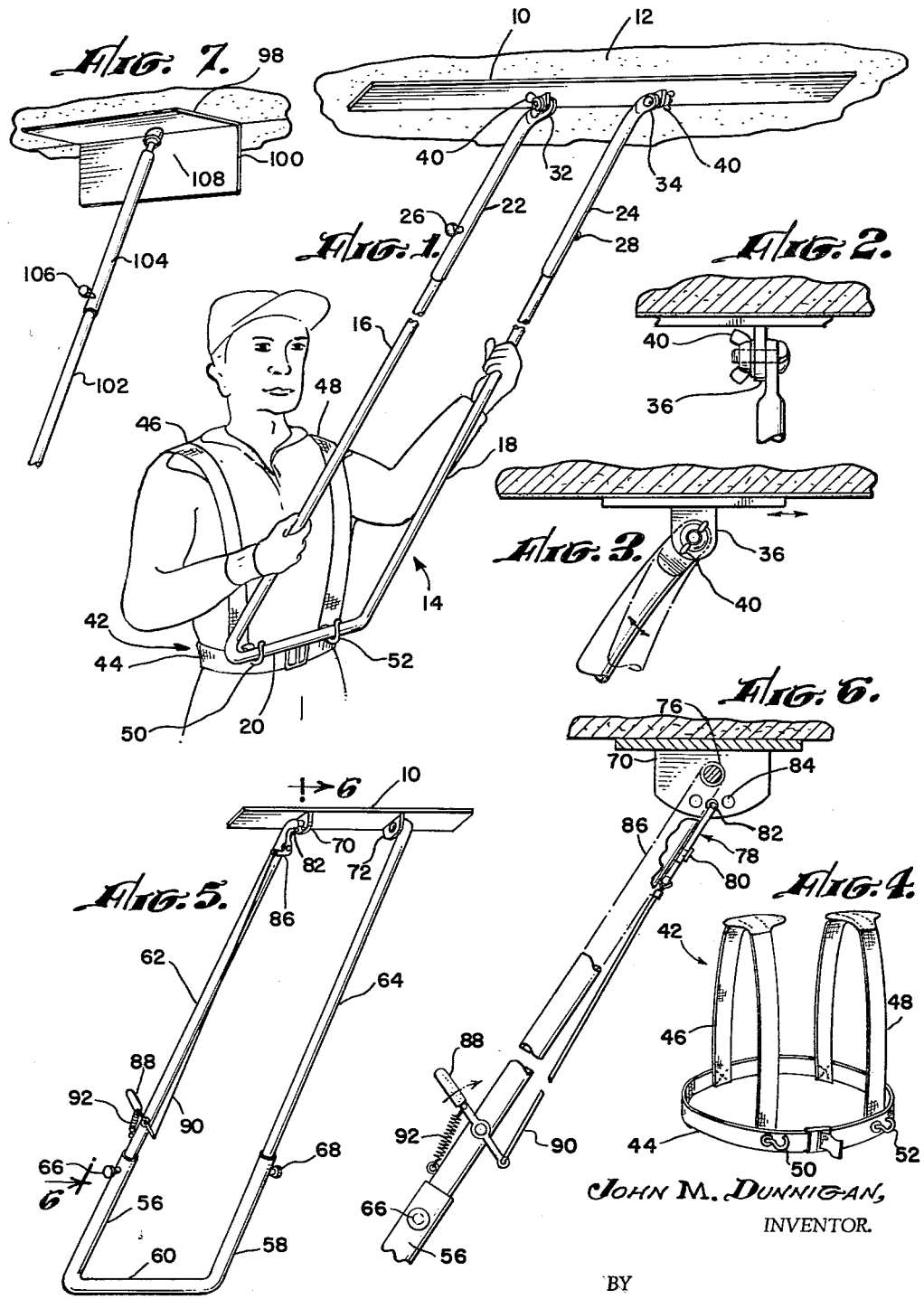

3,090,984
IMPLEMENT FOR OVERHEAD TOOL
MANIPULATION
John M. Dunnigan, 1118 S. Campus, Ontario, Calif.
Filed Mar. 23, 1961, Ser. No. 97,805
9 Claims. (Cl. 15—235.4)

The present invention relates generally to tools or manually operated devices; more particularly, the invention relates to tools for overhead manipulation.

Tools for performing operations on surfaces above an operator, such as the smoothing or spreading of plaster on ceilings and walls, have been characterized by disadvantages and shortcomings which have restricted their utility. Among these is the necessity for erecting scaffolding, ladders or stands so that surfaces above an operator may be reached. Such scaffolding or ladders must be erected or positioned for the performing of the operations, and often particular types of scaffolding must be provided, depending upon the nature and location of the surfaces on which operations are performed. Scaffolding, ladders or stands must be moved at intervals as work progresses from position to position.

The present invention provides a new and improved implement for the overhead manipulation of tools in the performing of operations on surfaces above an operator. The implement includes a harness worn by an operator, and handle means at the upper end of which a tool is attached. Means are provided on the harness means for engaging a portion of the handle for supporting the tool in an operative position above the operator for the overhead manipulation of the tool by the operator. The handle means preferably includes a U-shaped structure having a lower cross-bar, and the harness preferably includes a belt having supporting hardware for pivotally supporting the cross-bar for pivotal movement by the operator. In preferred forms of the invention, the arm portions of the U-shaped handle structure are of telescoping construction and are securable at selected lengths.

The invention is exemplified herein in the form of a plastering implement having a tool in the form of a plaster darby board. In preferred forms, latch means are provided for adjusting the angular position of the darby board relative to the handle means during operation, and for securing the darby board in a selected angular position.

By providing an upwardly extending and manually manipulatable implement, which is supported by the harness worn by the operator, the invention eliminates the need for scaffolding or ladders to elevate an operator to permit him to reach ceilings and surfaces above his head. It therefore simplifies the performing of overhead operations on ceilings and surfaces, such as the spreading and smoothing of plaster. The device is adjustable to accommodate various different heights of surfaces and the work of an operator is greatly reduced. Considerable economy is realized in the time required for operations. An operator may easily move about to perform operations on different areas, by merely walking about while manually manipulating the implement.

It is therefore an object of the present invention to provide an improved implement for overhead tool manipulation which eliminates the need for supporting scaffolding or ladders for an operator.

An object of the invention is the provision of an improved implement for overhead tool manipulation which is manually operable by an operator while the operator walks from one working position to another.

It is an object of the invention to provide an improved implement for overhead tool manipulation which is adjustable to accommodate different heights and orientations of surfaces in relation to an operator.

An object of this invention is to provide an improved implement for overhead tool manipulation wherein a tool is adjustably secured to handle means pivotally supported by a harness worn by an operator.

It is an object of the present invention to provide an implement according to the foregoing object wherein the tool comprises a plaster darby board and the handle means includes a U-shaped handle structure having telescoping arms, and wherein a harness worn by an operator has hardware for adjustably supporting the U-shaped handle structure.

An object of the invention is the provision of an improved implement according to certain of the foregoing objects wherein adjustment means are provided to permit an operator to selectively adjust the angular position of the darby board relative to the handle means.

It is an object of the invention to provide an implement for overhead manipulation of a plaster darby board having two mutually perpendicular surfaces for the smoothing or spreading of plaster adjacent to a juncture between a wall and a ceiling.

Other objects, features and advantages of the present invention will become apparent to those versed in the art from a consideration of the following description, the appended claims and the accompanying drawings, wherein:

FIGURE 1 is a perspective view of a preferred embodiment of the implement of the present invention being carried by an operator in operative position for overhead tool manipulation;

FIGURE 2 is a fragmentary elevational view showing details of the adjustable attachment of a tool or darby board utilized with the implement of FIGURE 1;

FIGURE 3 is a side view of the adjustable attachment structure of FIGURE 2;

FIGURE 4 is a perspective view of the harness shown being worn by the operator in FIGURE 1;

FIGURE 5 is a perspective view of a modified embodiment of the invention wherein a manually operable adjustment system is provided for the selective angular positioning of the darby board or tool;

FIGURE 6 is a partial elevational view of the implement of FIGURE 5; and

FIGURE 7 is a perspective view of another embodiment of the invention which includes a darby board having mutually perpendicular surfaces.

Referring to the drawing and particularly to FIGURE 1, there is shown a preferred embodiment of the implement of the present invention. A tool or darby board 10 is operatively positioned adjacent to a soft plaster surface 12 of a ceiling. The darby board is supported by a generally U-shaped handle assembly or structure having arms 16, 18 connected by a lower cross-bar 20 and having telescoping tubular arm portions 22, 24. The telescoping arm portions 22, 24 are secured in selected positions by set screws 26, 28 to secure the arms at adjusted lengths. End portions 32, 34 of the tubular arm portions 22, 24 are flattened, as shown in FIGURES 2 and 3. Extending downwardly from the tool or darby board 10 are brackets 36, to which end portions 32, 34 are adjustably secured by wing nuts 40.

The handle assembly 14 is supported by a harness 42 worn by an operator, as shown in FIGURES 1 and 4. The harness preferably includes a belt 44 and shoulder straps 46, 48 for supporting the belt on the operator's body. Secured to the front of the harness, preferably to the belt 44 as shown, are hardware supports or forwardly extending hooks 50, 52. The cross-bar 20 of the handle structure 14 is pivotally supported by the hooks 50, 52, as shown, so that the weight of the implement is supported and so that the tool may be manipulated by pivoting the handle structure in the hooks. The arms 16, 18 are preferably grasped by the operator, in the manner indicated in FIGURE 1, for the convenient manipulation of the tool by pivoting the handle assembly in the hooks and/or by sliding the handle assembly in the hooks transversely left or right relative to the operator's body.

From the foregoing, it will be understood that the implement may be conveniently utilized for such operations as the smoothing or spreading of plaster on ceilings or surfaces at different heights above an operator. The length of the handle structure is readily adjustable to accommodate different surface heights, by means of the set screws 26, 28. An operator may walk about during the performing operations on different areas, and may move freely from working position to working position without requiring any scaffolding or other supports, and without requiring the moving of any scaffold or support.

FIGURES 5 and 6 illustrate a modified handle assembly which includes an adjustment system for the selective angular positioning of the tool or plaster darby board 10. The handle assembly comprises a U-shaped handle structure having tubular arms 56, 58 connected by a cross-bar 60. The arms 62, 64 include telescoping tubular arm portions 56, 58, relative positional adjustment being provided by means of the set screws 66, 68. Bracket members 70, 72 extend from the darby board and have openings 76 in which bent inwardly extending end portions of arms 62, 64 are pivotally mounted. The angle or tilt of the darby board 10 relative to the arms is adjustable by the operator by means of a lever 78 pivotally connected at 80 to the arm 62. A bent end portion 82 of the lever is engageable in any of openings 84, which are arranged in an arc in the bracket member 70. The opposite end portion of the lever 78 is offset from the pivot at 80 so that upon the application of force or pull at lever portion 78, torque is produced at the pivot 80 to rotate the lever in a direction to withdraw end portion 82 from an opening 84. There is thus provided a latch mechanism for securing the darby board in various angular positions. A manually operable lever 88 is pivoted to the arm 62. The end of this lever is connected by a wire or link 90 to the end portion 86 of lever 78, as indicated in FIGURE 5. From the geometric relations of the parts, it will be understood that the lever 88 may be rotated in a direction to exert force on the wire or link 90, which is opposed by a biasing spring 92 which returns the lever 88 to a normal position when it is released by the operator. Upon the operation of the handle 88, the lever 78 is rotated to unlatch the end portion 82 from an opening in bracket 70. The angular position of the darby board relative to the handle assembly can be adjusted as desired, whereupon the mechanism is relatched by releasing the lever 88. In this manner the operator may adjust the tool or darby board to convenient angles to conform with different ceiling heights and with different operating positions of the tool or board relative to the operator's body and arms.

FIGURE 7 illustrates a modified embodiment of the invention wherein there is utilized a darby board which has mutually perpendicular portions 98, 100 configured for operations such as the smoothing or spreading of plaster adjacent to junctures between ceilings and walls. The darby board may be mounted on a handle assembly or structure similar to that of the embodiment of FIGURE 1, or it may be connected with a single handle member or holder of the type shown in FIGURE 7, which comprises a rod 102 in telescoping relation with a tubular element 104. A set screw 106 permits adjustments in length. The end portion of the handle is preferably attached by a ball-and-socket or swivel connection 108 to the darby board. The implement facilitates such operations as the smoothing of plaster adjacent to the corners or junctions between ceilings and walls, in a manner generally similar to the operation of the tool of FIGURE 1.

From the foregoing, those versed in the art will appreciate that the present invention achieves the objects and realizes the advantages hereinbefore mentioned.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. Handle and support means for an implement for performing operations on surfaces above an operator, said handle and support means comprising harness means worn by an operator, handle means carrying a tool at the upper end thereof, the handle means are of U-shaped construction having upwardly extending arms and a connecting lower portion, said harness means including a belt having hardware thereon for engaging and pivotally supporting the lower portion of the handle means for pivotal movement thereof by the operator, whereby the handle means and the tool are supported in an operative position wherein the handle means extend upwardly from the operator for overhead manipulation of the tool by the operator.

2. Handle and support means for an implement for performing operations on surfaces above an operator, said handle and support means comprising harness means worn by an operator, handle means carrying a tool at the upper end thereof, the handle means are of U-shaped construction having upwardly extending arms and a connecting lower portion, said arms being of telescoping construction and having means thereon for securing the arms at adjusted lengths, said harness means including a belt having hardware thereon for engaging and pivotally supporting the lower portion of the handle means for pivotal movement thereof by the operator, whereby the handle means and the tool are supported in an operative position wherein the handle means extend upwardly from the operator for overhead manipulation of the tool by the operator.

3. Handle and support means for an implement for performing operations on surfaces above an operator, said handle and support means comprising harness means worn by an operator, handle means having a plaster darby board adjustably attached at the upper end thereof, latch means for securing the darby board in selected positions of angular adjustment relative to the handle means, manually operable means on the handle means connected with the latch means for operating the latch means, and means on the harness means for engaging a lower portion of the handle means for supporting the handle means, whereby the handle means and the tool are supported in an operative position wherein the handle means extend upwardly from the operator for overhead manipulation of the tool by the operator.

4. Handle and support means for an overhead plaster darby board, comprising handle means connected with the darby board and including a U-shaped handle structure having arms connected by a lower handle portion, the end portions of the arms being adjustably attached to the darby board, and a harness worn by an operator, said harness including a belt having carrying means engaging the lower handle portion of the U-shaped handle structure, whereby the plaster darby board is supported by the handle means and by the harness in an operative position outwardly from and above the operator for overhead manipulation thereof by the operator.

5. Handle and support means for an overhead plaster darby board, comprising handle means connected with the darby board and including a U-shaped handle structure having arms connected by a lower handle portion, said arms being of telescoping construction and having means thereon for securing the arms at adjusted lengths, the end portions of the arms being adjustably attached to the darby board, and a harness worn by an operator, said harness including a belt having carrying means engaging the lower handle portion of the U-shaped handle structure, whereby the plaster darby board is supported by the handle means and by the harness in an operative position outwardly from and above the operator for overhead manipulation thereof by the operator.

6. Handle and support means for an overhead plaster darby board, comprising handle means connected with the darby board and including a U-shaped handle structure having arms connected by a cross-bar, the end portions of the arms being adjustably attached to the darby board, and a harness worn by an operator, said harness carrying supporting hardware in the form of forwardly extending hooks for pivotally supporting the cross-bar of the handle means, said cross-bar being movable transversely while pivotally supported by said hooks, whereby the plaster darby board is supported by the handle means and by the harness in an operative position outwardly from and above the operator for overhead manipulation thereof by the operator.

7. Handle and support means for an overhead plaster darby board, comprising handle means including a U-shaped handle structure having arms connected by a lower handle portion, adjustable pivot means interconnecting the darby board and said arms, a harness worn by an operator, said harness including a belt having carrying means engaging the lower handle portion of the U-shaped handle structure, latch means for securing the darby board in adjusted positions relative to the arms, and manually operable lever means connected with the lower portion of the handle means and with said latch means, whereby the means are manually operable to adjust the angle of tilt of the darby board relative to the handle means and to secure the darby board in an adjusted position, and whereby the plaster darby board is supported by the handle means and by the harness in an operative position outwardly from and above the operator for overhead manipulation thereof by the operator.

8. A plastering implement for overhead manipulation, comprising a plaster darby board having a flat surface for the smoothing of plaster surfaces, elongated handle means connected with the plaster darby board, swivel connection means interconnecting the darby board and the handle means, means comprising a harness worn by an operator, and means whereby the handle means and the darby board are supported from the harness for manipulation by the operator.

9. A plastering implement for overhead manipulation, comprising a tool having mutually perpendicular flat surfaces configurated to fit a juncture between a wall and a ceiling, elongated handle means connected with said tool, swivel connection means interconnecting said tool and the handle means, means comprising a harness worn by an operator, and means whereby the handle means and the tool are supported from the harness for manipulation by the operator to spread and smooth plaster adjacent to said juncture between a wall and a ceiling.

References Cited in the file of this patent

UNITED STATES PATENTS

| | | |
|---|---|---|
| 1,590,342 | Abram | June 29, 1926 |
| 1,713,513 | Abram | May 21, 1929 |
| 2,603,892 | Fischer | July 22, 1952 |
| 2,685,876 | Sanderson | Aug. 10, 1954 |
| 2,688,510 | Heyser | Sept. 7, 1954 |
| 2,989,334 | Browne | June 20, 1961 |